United States Patent
Maani et al.

(10) Patent No.: US 10,554,987 B2
(45) Date of Patent: Feb. 4, 2020

(54) CODEWORD SPACE REDUCTION FOR INTRA CHROMA MODE SIGNALING FOR HEVC

(71) Applicant: SONY CORPORATION, Tokyo (JP)

(72) Inventors: Ehsan Maani, San Jose, CA (US); Wei Liu, San Jose, CA (US); Lina Dong, San Jose, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/110,029

(22) Filed: Aug. 23, 2018

(65) Prior Publication Data

US 2019/0058890 A1  Feb. 21, 2019

Related U.S. Application Data

(63) Continuation of application No. 15/452,544, filed on Mar. 7, 2017, now Pat. No. 10,123,026, which is a
(Continued)

(51) Int. Cl.
*H04N 19/186* (2014.01)
*H04N 19/13* (2014.01)
(Continued)

(52) U.S. Cl.
CPC .......... *H04N 19/186* (2014.11); *H04N 19/13* (2014.11); *H04N 19/159* (2014.11);
(Continued)

(58) Field of Classification Search
None
See application file for complete search history.

(56) References Cited

U.S. PATENT DOCUMENTS

2005/0157797 A1 7/2005 Gaedke
2008/0310507 A1 12/2008 Ye et al.
(Continued)

FOREIGN PATENT DOCUMENTS

KR  10-1872663 B1  6/2018
KR  10-1912567 B1  10/2018

OTHER PUBLICATIONS

Office Action for KR Patent Application No. 10-2018-0125318, dated Dec. 19, 2018, 6 pages of Office Action and 5 pages of English Translation.
(Continued)

*Primary Examiner* — Frederick D Bailey
(74) *Attorney, Agent, or Firm* — Chip Law Group

(57) ABSTRACT

Intra prediction is used in state-of-the-art video coding standards such as AVC. The intra prediction modes are coded into the bitstream. Luma and chroma components could potentially have different prediction modes. For chroma components, there are 7 different modes defined in AVC: vertical, horizontal, DC, diagonal directions, and "same as luma". Statistics show that the "same as luma" mode is frequently used, but in AVC, this mode is encoded using more bits than other modes during entropy coding, therefore the coding efficiency is decreased. Accordingly, a modified binarization/codeword assignment for chroma intra mode signaling is able to be utilized for high efficiency video coding (HEVC), the next generation video coding standard.

12 Claims, 3 Drawing Sheets

Related U.S. Application Data continuation of application No. 14/447,356, filed on Jul. 30, 2014, now Pat. No. 9,591,323, which is a continuation of application No. 13/227,732, filed on Sep. 8, 2011, now Pat. No. 9,232,227, which is a continuation-in-part of application No. 13/038,129, filed on Mar. 1, 2011, now Pat. No. 10,080,016.

(60) Provisional application No. 61/448,031, filed on Mar. 1, 2011, provisional application No. 61/432,970, filed on Jan. 14, 2011, provisional application No. 61/432,957, filed on Jan. 14, 2011.

(51) Int. Cl.
  *H04N 19/503* (2014.01)
  *H04N 19/463* (2014.01)
  *H04N 19/593* (2014.01)
  *H04N 19/159* (2014.01)

(52) U.S. Cl.
  CPC ......... *H04N 19/463* (2014.11); *H04N 19/503* (2014.11); *H04N 19/593* (2014.11)

(56) References Cited

U.S. PATENT DOCUMENTS

| | | |
|---|---|---|
| 2009/0175334 A1 | 7/2009 | Ye et al. |
| 2010/0208827 A1 | 8/2010 | Divorra Esconda et al. |
| 2011/0255591 A1 | 10/2011 | Kim et al. |
| 2012/0106652 A1 | 5/2012 | Huang et al. |
| 2012/0155533 A1 | 6/2012 | Puri et al. |
| 2012/0177112 A1 | 7/2012 | Guo et al. |

OTHER PUBLICATIONS

Notice of Allowance and Fees Due for U.S. Appl. No. 15/452,544, dated Jul. 5, 2018, 7 pages.
Non-Final Rejection for U.S. Appl. No. 15/452,544, dated Feb. 6, 2018, 10 pages.
Chen, et al., "Chroma Intra Prediction by Reconstructed Luma Samples", Joint Collaborative Team on Video Coding (JCT-VC) of ITU-T SG16 WP3 and ISO/IEC JTC1/SC29/WG11, JCTVC-C206, 3rd Meeting: Guangzhou, CN, Oct. 7-15, 2010, 7 pages.
Wiegand, et al., "WD1: Working Draft 1 of High-Efficiency Video Coding", Joint Collaborative Team on Video Coding (JCT-VC) of ITU-T SG16 WP3 and ISO/IEC JTC1/SC29IWG11, JCTVC-C403, 3rd Meeting: Guangzhou, CN, Oct. 7-15, 2010, 137 pages.
Office Action for KR Patent Application No. 10-2017-0034598, dated Apr. 28, 2017, 04 pages of Office Action and 03 pages of English Translation.
Tabatabai, et al., "HM2 Chroma Intra Coding Description," Joint Collaborative Team on Video Coding (JCT-VC) of ITU-T SG16 WP3 and ISO/IEC JTC1/SC29/WGil, 3rd Meeting: Guangzhou, CN, Oct. 7-15, 2010, Document: JCTVC-E395.
Office Action received for Korean Patent Application No. 10-2013-0066403, dated May 31, 2016, 07 pages of Office Action and 03 pages of English Translation.
Advisory Action for U.S. Appl. No. 13/038,129, dated Jun. 22, 2017, 03 pages.
Notice of Allowance and Fees Due for U.S. Appl. No. 13/038,129, dated May 14, 2018, 08 pages.
Final Rejection for U.S. Appl. No. 13/038,129, dated Apr. 12, 2017, 15 pages.
Non-Final Rejection for U.S. Appl. No. 13/038,129, dated Nov. 16, 2017, 14 pages.
Non-Final Rejection for U.S. Appl. No. 13/038,129, dated Dec. 9, 2016, 15 pages.
Final Rejection for U.S. Appl. No. 13/038,129, dated May 11, 2016, 14 pages.
Non-Final Rejection for U.S. Appl. No. 13/038,129, dated Sep. 29, 2015, 13 pages.
Final Rejection for U.S. Appl. No. 13/038,129, dated Nov. 5, 2014, 13 pages.
Non-Final Rejection for U.S. Appl. No. 13/038,129, dated Jul. 1, 2014, 13 pages.
Advisory Action for U.S. Appl. No. 13/038,129, dated Jan. 14, 2014, 3 pages.
Final Rejection for U.S. Appl. No. 13/038,129, dated Nov. 7, 2013, 11 pages.
Non-Final Rejection for U.S. Appl. No. 13/038,129, dated Jul. 17, 2013, 11 pages.
Notice of Allowance and Fees Due for U.S. Appl. No. 13/227,732, dated Sep. 23, 2015, 07 pages.
Non-Final Rejection for U.S. Appl. No. 13/227,732, dated Feb. 19, 2015, 13 pages.
Final Rejection for U.S. Appl. No. 13/227,732, dated Apr. 30, 2014, 14 pages.
Non-Final Rejection for U.S. Appl. No. 13/227,732, dated Jan. 14, 2014, 19 pages.
Notice of Allowance and Fees Due for U.S. Appl. No. 14/447,356, dated Oct. 26, 2016, 09 pages.
Notice of Allowance for U.S. Appl. No. 16/013,160 dated Aug. 14, 2019.

CODEWORD SPACE REDUCTION FOR INTRA CHROMA MODE SIGNALING FOR HEVC

CROSS-REFERENCE TO RELATED APPLICATION(S)

This application is a continuation of U.S. patent application Ser. No. 15/452,544, filed Mar. 7, 2017, which is a continuation of U.S. patent application Ser. No. 14/447,356, now U.S. Pat. No. 9,591,323, filed Jul. 30, 2014, which is a continuation of U.S. patent application Ser. No. 13/227,732, now U.S. Pat. No. 9,232,227, filed Sep. 8, 2011, which is a continuation-in-part of U.S. patent application Ser. No. 13/038,129, filed Mar. 1, 2011, and also is hereby incorporated by reference, and claims priority under 35 U.S.C. § 119(e) of the U.S. Provisional Patent Application Ser. No. 61/448,031, filed Mar. 1, 2011. Further, U.S. patent application Ser. No. 13/038,129, is hereby incorporated by reference, and claims priority under 35 U.S.C. § 119(e) of the U.S. Provisional Patent Application Ser. No. 61/432,957, filed Jan. 14, 2011, and U.S. Provisional Patent Application Ser. No. 61/432,970, filed Jan. 14, 2011. Each of the above-referenced applications is hereby incorporated herein by reference in its entirety.

FIELD OF THE INVENTION

The present invention relates to the field of image processing. More specifically, the present invention relates to a modified codeword assignment for intra chroma mode signaling for High Efficiency Video Coding (HEVC).

BACKGROUND OF THE INVENTION

A standard binarization/Variable Length Coding (VLC) codeword assignment scheme used in Advanced Video Coding (AVC) is shown in Table 1. In AVC, the prediction mode for an intra coded block is signaled in the bitstream to the decoder. Possible chroma prediction modes/directions are vertical, horizontal, DC, diagonal and "same as luma." The modes are each assigned a codeword from 0 through 4 and are signaled using truncated unary code in the bitstream.

TABLE 1

| Intra prediction mode for chroma component. | |
|---|---|
| intra_pred_mode_chroma | Binarization/VLC Codeword |
| 0 (vertical) | 0 |
| 1 (horizontal) | 10 |
| 2 (DC) | 110 |
| 3 (diagonal down right) | 1110 |
| 4 (same as luma) | 1111 |

A statistical study shows that there is a high probability for the chroma components to use the sample prediction direction as the luma component of the block. However, the "same as luma" mode is assigned the longest codeword in Table 1 (4 bits), which is not efficient. On the other hand, redundancy also exists between mode 4 and mode 0–3, when the luma prediction mode is one of vertical, horizontal, DC and diagonal down right. Therefore, a better design of the codeword table is needed.

SUMMARY OF THE INVENTION

Intra prediction is used in state-of-the-art video coding standards such as AVC. The intra prediction modes are coded into the bitstream. Luma and chroma components could potentially have different prediction modes. For chroma components, there are 7 different modes defined in AVC: vertical, horizontal, DC, diagonal directions, and "same as luma". Statistics show that the "same as luma" mode is frequently used, but in AVC, this mode is encoded using more bits than other modes during entropy coding, therefore the coding efficiency is decreased. Accordingly, a modified binarization/codeword assignment for chroma intra mode signaling is able to be utilized for high efficiency video coding (HEVC), the next generation video coding standard.

In one aspect, a method programmed in a controller of a device comprises programming a codeword assignment, determining if a "same as luma" mode is equal to another mode, if the "same as luma" mode is equal to another mode, reconfiguring the codeword assignment including assigning a codeword of the mode that is equal to the "same as luma" mode to a different mode and performing intra coding using the modified codeword assignment. The different mode is an unassigned mode. The codeword assignment comprises seven modes including vertical, horizontal, DC, VER−8, VER−4, "same as luma" and an additional mode. The additional mode is selected from the group consisting of VER+8, VER+4 and HOR+8. The codeword for the "same as luma" mode includes the fewest bits of the assigned modes. The intra coding is used to decode an image. The codeword assignment is programmed in a memory of the device. The codeword assignment includes programming hardware logic. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus for implementing a codeword assignment comprises a programming module for programming a codeword assignment, a comparison module for determining if a "same as luma" mode is equal to another mode, a reconfiguring module for reconfiguring the codeword assignment, if the "same as luma" mode is equal to another mode, wherein reconfiguring includes assigning a codeword of the mode that is equal to the "same as luma" mode to a different mode and an intra coding module for selecting an unassigned mode as the intra coding mode and signaling the intra coding mode to a decoder. The codeword assignment comprises seven modes including vertical, horizontal, DC, VER−8, VER−4, VER+4, "same as luma" and an additional unassigned mode. The additional unassigned mode is selected from the group consisting of VER+8, VER+4, and HOR+8. A codeword for the "same as luma" mode includes the fewest bits of the assigned modes. The intra coding is used to decode an image. The codeword assignment is programmed in a memory of the device. The codeword assignment includes programming hardware logic. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for programming a codeword assignment with modes including vertical, horizontal, DC, one or more diagonal directions and "same as luma," determining if the "same as luma" mode is the same as another mode, and if the "same as luma" mode is the same as the another mode, then reconfiguring the codeword assignment including assigning a codeword of the mode that is equal to the "same as luma" mode to a different mode and allowing an unassigned mode to be selected as an intra coding mode and signaling the intra coding mode to the decoder and a processing component coupled to the memory, the processing component configured for processing the application. The one or more diagonal directions comprise at least three of VER−8, VER−4, VER+4, VER+8 and HOR+8. The "same as luma" mode includes the fewest bits of the assigned modes. The intra coding is used to decode an image. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

DETAILED DESCRIPTION OF THE PREFERRED EMBODIMENT

Figure 1:
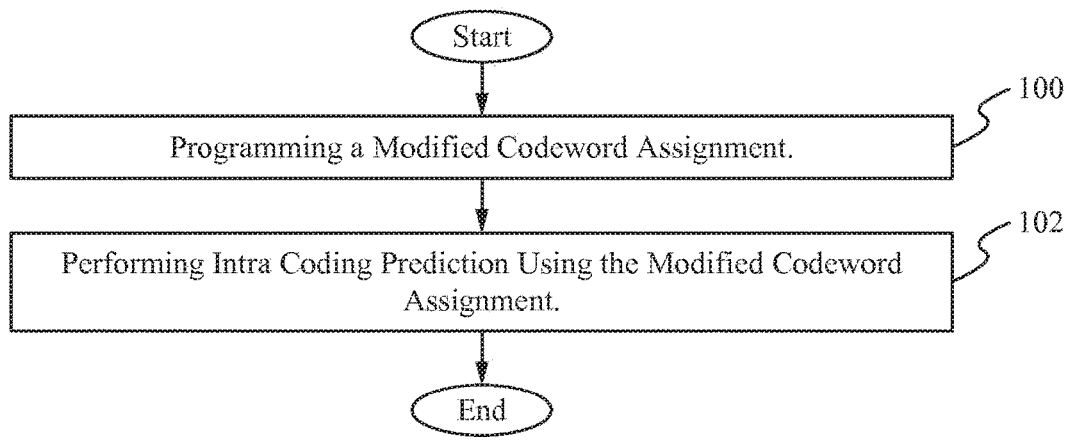
FIG. 1 illustrates a flowchart of a method of intra coding prediction using a modified codeword assignment according to some embodiments.

Since the texture pattern of luma and chroma components are correlated, often times the mode used for the luma prediction is also good for the chroma prediction. Thus, the "same as luma" mode is likely to be the best mode. Therefore, a redefined binarization/Variable Length Coding (VLC) scheme is shown in Table 2. As shown, the "same as luma" mode has the shortest codeword (only 1 bit) in the improved scheme. Additionally, several directions have been added in Table 2. Seven fixed chroma intra prediction directions are shown. Codewords are defined for only six of the seven directions. The additional direction is selected to be VER+8 in this example. When a mode is found to be the same as luma, the additional direction/mode (e.g. direction index 6) is coded using the available codeword from the list. For example, if VER−8 is the same as luma, then 1111 is able to be used as the codeword for VER+8. Although seven modes are shown, more or fewer directions are able to be used. The shown codewords are able to be applied to different binarizations.

TABLE 2

Extended Redefined List of Directions and Codewords.

| | Direction | Codeword |
|---|---|---|
| 0 | Same as Luma | 0 |
| 1 | VER | 10 |
| 2 | HOR | 1110 |
| 3 | DC | 1101 |
| 4 | VER − 8 | 1111 |
| 5 | VER − 4 | 1100 |
| 6 | VER + 8 | |

Furthermore, chroma intra modes are not mutually exclusive. For example, if the luma intra mode is vertical, then the "same as luma" is the same as vertical. Therefore, codeword space reassignment is able to be used to further improve coding efficiency, such that if the luma mode is one of vertical, horizontal, DC, VER−8, VER−4 or VER+8, the corresponding mode is removed from the chroma mode list, and accordingly, an additional mode (e.g. VER+8) is able to implement an unused codeword. Table 3 shows a list of codewords.

TABLE 3

List of codewords using codeword space reduction.

| | VER | HOR | DC | VER − 8 | VER + 8 | HOR + 8 | Others |
|---|---|---|---|---|---|---|---|
| Vertical | n/a | 10 | 10 | 10 | 10 | 10 | 10 |
| Horizontal | 10 | n/a | 1110 | 1110 | 1110 | 1110 | 1110 |
| DC | 1110 | 1110 | n/a | 1101 | 1101 | 1101 | 1101 |
| Diagonal (VER − 8) | 1101 | 1101 | 1101 | n/a | 1111 | 1111 | 1111 |
| Diagonal (VER − 4) | 1111 | 1111 | 1111 | 1111 | n/a | 1110 | 1110 |
| Diagonal (VER + 8) | 1100 | 1100 | 1100 | 1100 | 1100 | n/a | |
| Same as Luma | 0 | 0 | 0 | 0 | 0 | 0 | 0 |

Table 4 shows another example of a redefined binarization/Variable Length Coding (VLC) scheme. Seven fixed chroma intra prediction directions are shown. Codewords are defined for only six of the seven directions. When the same as luma occurs, the additional direction (e.g. direction index 6) is coded using the available codeword from the list. For example, if VER−8 is the same as luma, then 1111 is able to be used as the codeword for HOR+8.

TABLE 4

Extended Redefined List of Directions and Codewords.

| | Direction | Codeword |
|---|---|---|
| 0 | Same as Luma | 0 |
| 1 | VER | 10 |
| 2 | HOR | 1110 |

TABLE 4-continued

Extended Redefined List of Directions and Codewords.

| | Direction | Codeword |
|---|---|---|
| 3 | DC | 1101 |
| 4 | VER − 8 | 1111 |
| 5 | VER + 8 | 1100 |
| 6 | HOR + 8 | |

Table 5 shows a complete list of codewords using the directions of Table 4. Codeword spac reassignment is able to be used to further improve coding efficiency, such that if the luma mode is one of vertical, horizontal, DC, VER−8, VER+8 or VER+8, the corresponding mode is removed from the chroma mode list, and accordingly, an additional mode (e.g. HOR+8) is able to implement an unused codeword. Table 5 shows a list of codewords.

TABLE 5

List of codewords using codeword space reduction.

| | VER | HOR | DC | VER − 8 | VER + 8 | HOR + 8 | Others |
|---|---|---|---|---|---|---|---|
| Vertical | n/a | 10 | 10 | 10 | 10 | 10 | 10 |
| Horizontal | 10 | n/a | 1110 | 1110 | 1110 | 1110 | 1110 |
| DC | 1110 | 1110 | n/a | 1101 | 1101 | 1101 | 1101 |
| Diagonal (VER − 8) | 1101 | 1101 | 1101 | n/a | 1111 | 1111 | 1111 |
| Diagonal (VER + 8) | 1111 | 1111 | 1111 | 1111 | n/a | 1110 | 1110 |
| Diagonal (HOR + 8) | 1100 | 1100 | 1100 | 1100 | 1100 | n/a | |
| Same as Luma | 0 | 0 | 0 | 0 | 0 | 0 | 0 |

FIG. 1 illustrates a flowchart of a method of intra coding prediction using a modified codeword assignment according to some embodiments. In the step 100, a modified codeword assignment is programmed. In some embodiments, programming includes storing the assignment in memory. In some embodiments, programming includes designing hardware to implement the assignment. In some embodiments, another method of programming is implemented. Tables 2 and 4 (above) show examples of modified codeword assignments where the "same as luma" codeword uses the fewest bits. In the step 102, the modified codeword assignment is utilized to perform intra coding prediction by allowing an unassigned mode to be selected as the intra prediction mode and then signaled to the decoder (e.g. determining a directional prediction mode). In some embodiments, fewer or additional steps are implemented.

Figure 2:
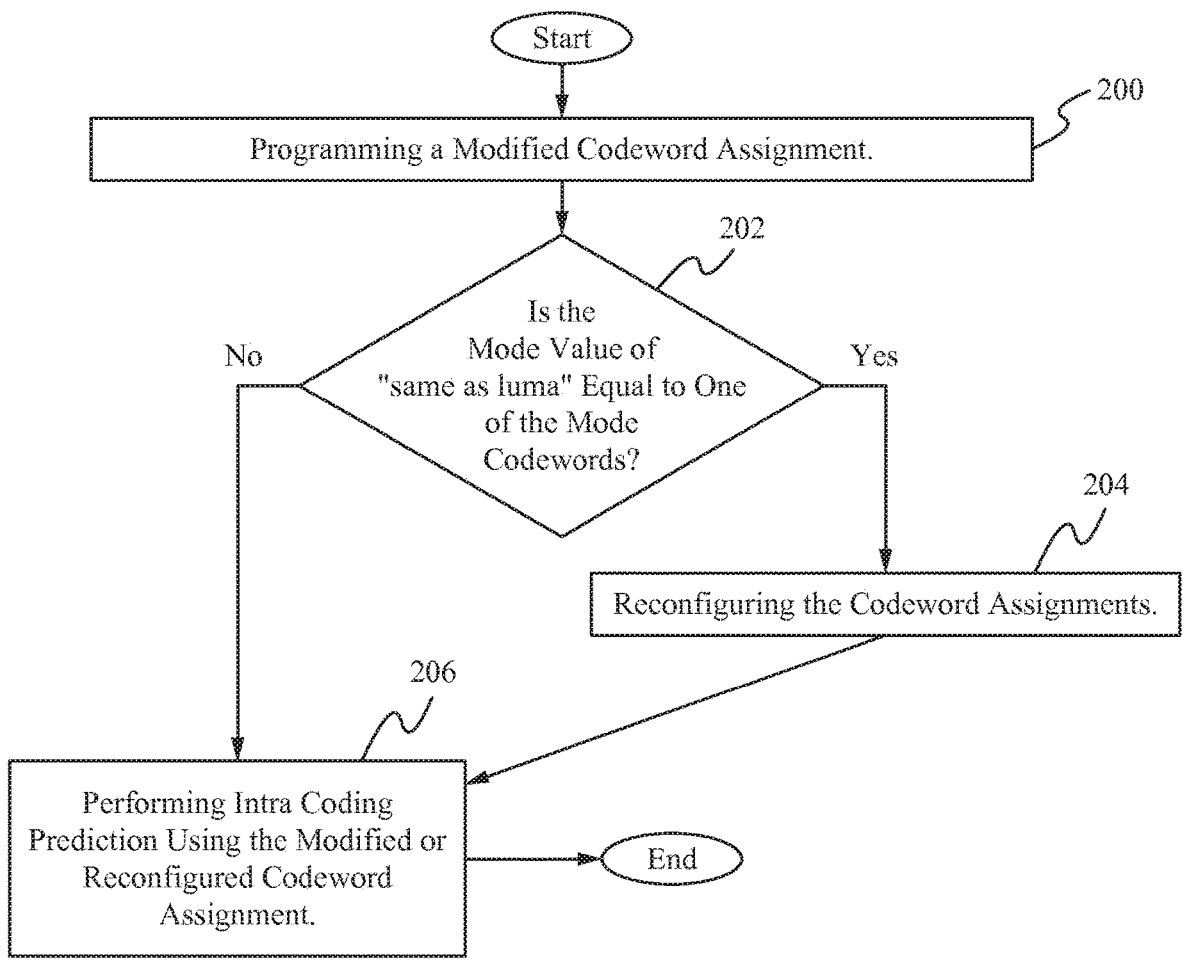
FIG. 2 illustrates a flowchart of a method of modifying a codeword assignment according to some embodiments.

FIG. 2 illustrates a flowchart of a method of modifying a codeword assignment according to some embodiments. In the step 200, a modified codeword assignment is programmed. In some embodiments, programming includes storing the assignment in memory. In some embodiments, programming includes designing hardware to implement the assignment. In some embodiments, another method of programming is implemented. In the step 202, it is determined if the mode value of "same as luma" is the same as one of the mode codewords. If the mode value of "same as luma" is not the same as one of the mode codewords, then the codeword assignment is not modified further, and the process goes to the step 206. If the mode value of "same as luma" is the same as one of the mode codewords, then in the step 204, in some embodiments, some or all of the remaining mode codewords are reconfigured and the codeword assignment is modified. For example, the codewords are reconfigured as shown in Tables 3 or 5 above. In some embodiments, an additional mode codeword is used for an additional direction/mode (e.g. HOR+8 in Table 5). In some embodiments, the mode codeword of the mode that is the same as luma mode is used for the additional direction. In the step 206, the modified codeword assignment is utilized to perform intra coding prediction by allowing an unassigned mode to be selected as the intra prediction mode and then signaled to the decoder (e.g. determining a directional prediction mode). The steps of modifying the codeword assignment is able to be repeated as needed. In some embodiments, fewer or additional steps are implemented. For example, in some embodiments, the step 200 is skipped or moved.

Figure 3:
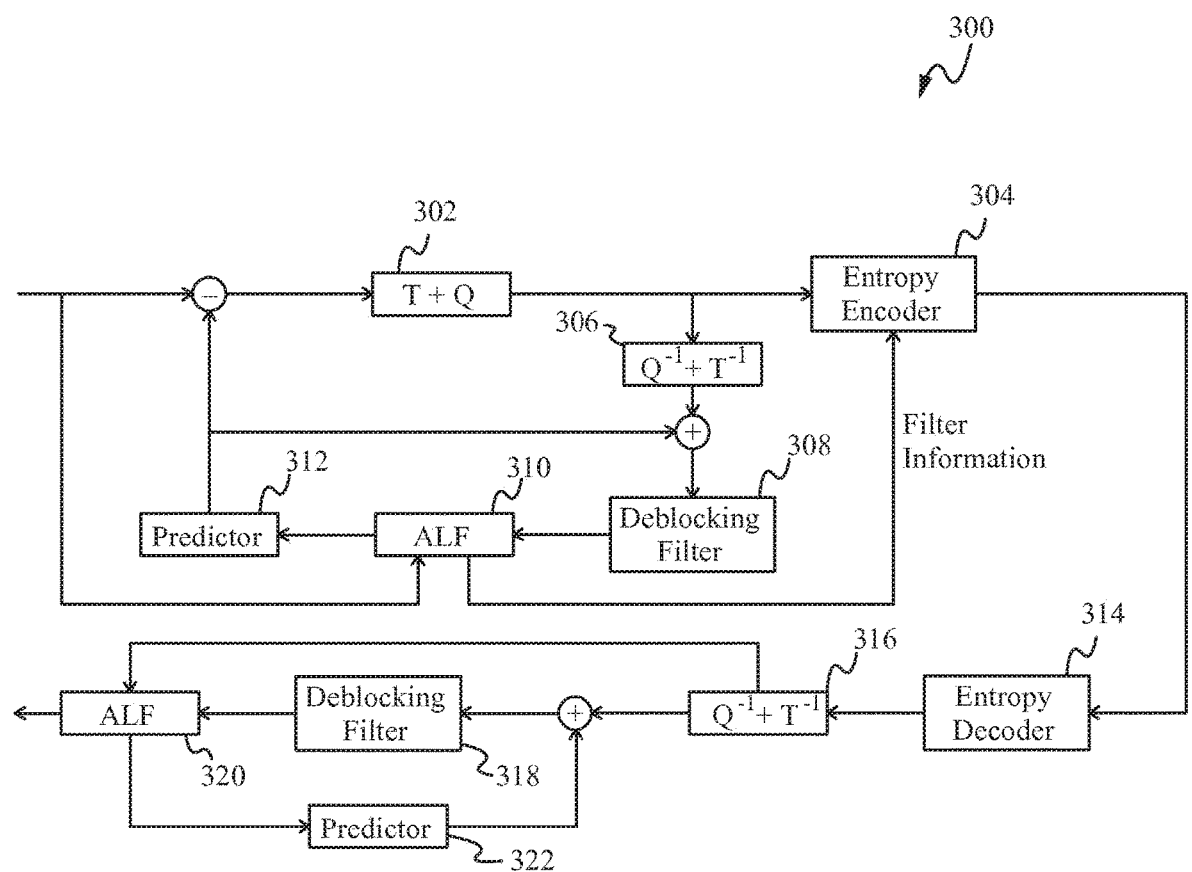
FIG. 3 illustrates a block diagram of a coder/decoder (codec) according to some embodiments.

FIG. 3 illustrates a block diagram of a coder/decoder (codec) according to some embodiments. An input video is received at the codec 300, and the video is split into a plurality of blocks. The codec 300 includes encoder components including: a Transform/Quantization module 302 where transform coefficients are scaled and quantized, an entropy encoder 304 such as a Context Adaptive Binary Arithmetic Coding (CABAC) performs entropy coding, an inverse Transform/Quantization module 306 applies an inverse transform/quantization, a deblocking filter 308 is implemented to control the strength of the filtering to reduce the pixelation of the image, an adaptive loop filter 310 improves coding efficiency by applying filters to the deblocking-filtered image and a predictor 312 performs prediction steps. The codec 300 also includes decoder components including: an entropy decoder 314 for implementing entropy decoding, a second inverse Transform/Quantization module 316, a second deblocking filter 318, a second adaptive loop filter 320 and a second predictor 322, which perform similar operations to those described above except in a decoding implementation. In the predictor 312, the modified codeword assignment is implemented to provide more efficient intra mode prediction. Fewer or additional components are able to be included as well.

Figure 4:
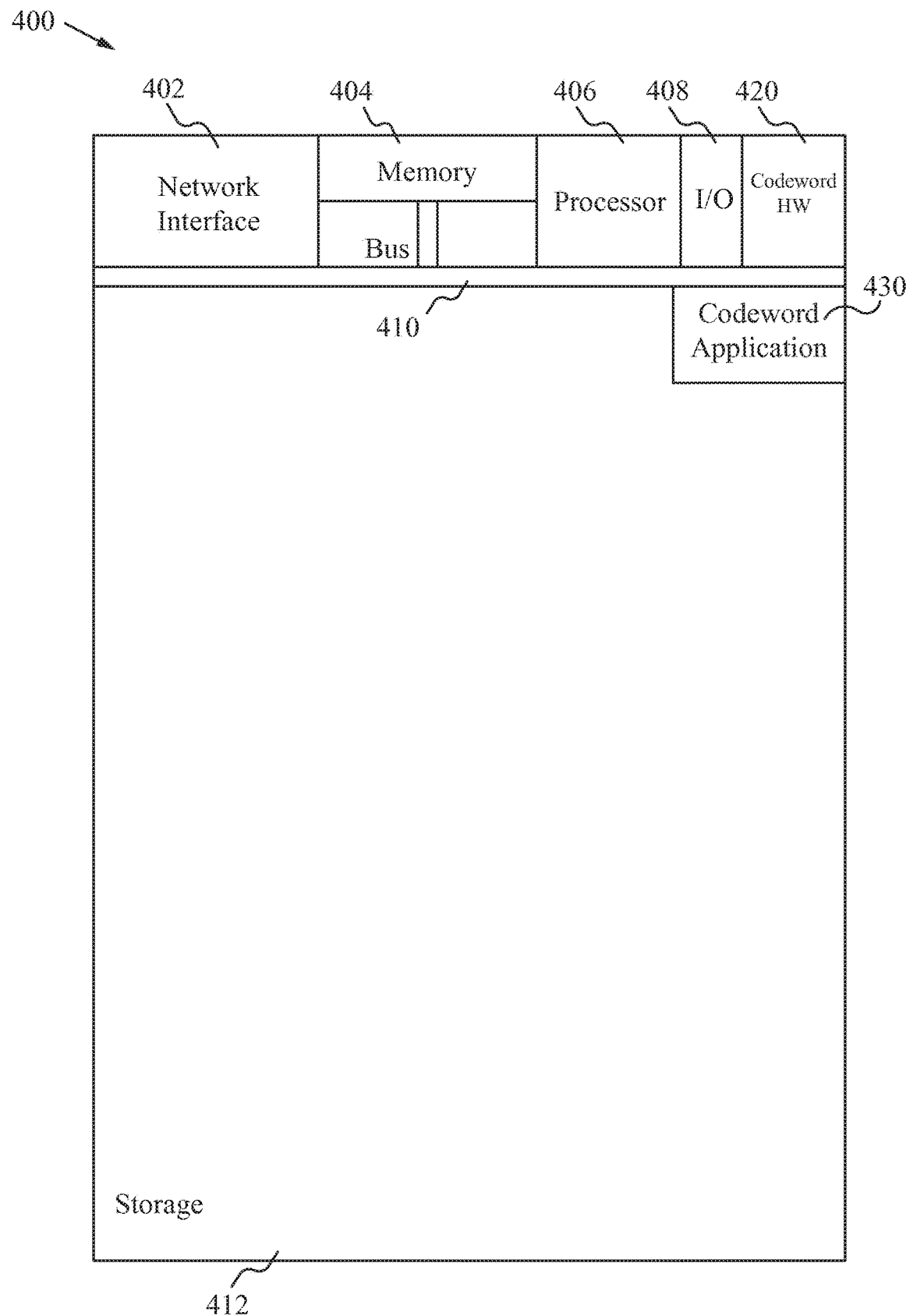
FIG. 4 illustrates a block diagram of an exemplary computing device configured to implement a modified codeword assignment according to some embodiments.

FIG. 4 illustrates a block diagram of an exemplary computing device 400 configured to implement the modified codeword assignment according to some embodiments. The computing device 400 is able to be used to acquire, store, compute, process, communicate and/or display information such as images, videos and audio. For example, a computing device 400 is able to acquire and store an image. The modified codeword assignment is able to be used during or after acquiring the image, or when displaying the image on the device 400. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. In some embodiments, the hardware structure includes multiple processors and other hardware to perform parallel processing. Modified codeword assignment application(s) 430 used to implement the modified syntax are likely to be stored in the storage device 412 and memory 404 and processed as applications are typically processed. More or fewer components shown in FIG. 4 are able to be included in the computing device 400. In some embodiments, modified codeword assignment hardware 420 is included. Although the computing device 400 in FIG. 4 includes applications 430 and hardware 420 for implementing the modified codeword assignment, the modified codeword assignment is able to be implemented on a computing device in hardware, firmware, software or any combination thereof. For example, in some embodiments, the modified codeword assignment applications 430 are programmed in a memory and executed using a processor. In another example, in some embodiments, the modified codeword assignment hardware 420 is programmed hardware logic including gates specifically designed to implement the method.

In some embodiments, the modified codeword assignment application(s) 430 include several applications and/or modules. Modules include a programming module for programming a modified codeword assignment, an intra coding prediction module for performing the intra coding prediction using the modified codeword assignment by allowing an unassigned mode to be selected as the intra prediction mode and then signaled to the decoder, a comparison module for determining if the "same as luma" mode value is equal to one of the mode codewords and a reconfiguring module for reconfiguring the codeword assignment. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize the modified codeword assignment, a user acquires a video/image such as on a digital camcorder, and while or after the video is acquired, or when displaying the video, the modified codeword assignment is utilized in the intra coding prediction aspect of encoding the video. The modified codeword assignment is able to be implemented automatically without user involvement.

In operation, the modified codeword assignment enables more efficient prediction. A simple modified codeword assignment is able to be used where "same as luma" has the shortest codeword, or a slightly more complex codeword assignment is able to be used where the codeword assignment changes depending on whether "same as luma" mode is the same as one of the other modes. Additionally, in some embodiments, one or more additional modes are able to be available for codeword reassignment based on which mode is the same as luma. In some embodiments, the luma prediction is checked at the encoder, the decoder or both.

What is claimed is:

1. A decoding apparatus, comprising:
   circuitry configured to:
   decode encoded image data based on intra prediction mode information for a chroma component of an image,
   wherein the encoded image data comprises one of a first codeword or a second codeword,
   wherein the intra prediction mode information for the chroma component of the image is based on the first codeword, and each of an intra prediction mode of the chroma component and an intra prediction mode of a luma component of the image is VER+8 mode,
   wherein the intra prediction mode information for the chroma component specifies the intra prediction mode of the chroma component,
   wherein the intra prediction mode information for the chroma component of the image is based on the second codeword, the intra prediction mode of the chroma component is VER+8 mode, and the intra prediction mode of the luma component is one of a DC mode, a vertical mode or, a horizontal mode, and
   wherein the first codeword is shorter than the second codeword.

2. The decoding apparatus according to claim 1, wherein the circuitry is further configured to set the intra prediction mode information for the chroma component to 4 based on the intra prediction mode of the chroma component is same as the intra prediction mode of the luma component.

3. The decoding apparatus according to claim 1, wherein the circuitry is further configured to determine the intra prediction mode of the chroma component based on the intra prediction mode information for the chroma component.

4. The decoding apparatus according to claim 1, wherein the intra prediction mode of the chroma component is one of the vertical mode, the horizontal mode, or the DC mode.

5. The decoding apparatus according to claim 3, wherein the circuitry is further configured to determine the intra prediction mode of the chroma component based on the intra prediction mode information for the chroma component and the intra prediction mode of the luma component is one of the vertical mode, the horizontal mode, or the DC mode.

6. A decoding method, comprising:
   decoding encoded image data based on intra prediction mode information for a chroma component of an image,
   wherein the encoded image data comprises one of a first codeword or a second codeword,
   wherein the intra prediction mode information for the chroma component of the image is based on the first codeword, and each of an intra prediction mode of the chroma component and an intra prediction mode of a luma component of the image is VER+8 mode,
   wherein the intra prediction mode information for the chroma component specifies the intra prediction mode of the chroma component,
   wherein the intra prediction mode information for the chroma component of the image is based on the second codeword, the intra prediction mode of the chroma component is VER+8 mode, and the intra prediction mode of the luma component is one of a DC mode, a vertical mode, or a horizontal mode, and
   wherein the first codeword is shorter than the second codeword.

7. An encoding apparatus, comprising:
circuitry configured to:
encode image data based on intra prediction mode information for a chroma component of an image,
wherein the intra prediction mode information for the chroma component of the image is based on a first codeword, and each of an intra prediction mode of the chroma component and an intra prediction mode of a luma component of the image is VER+8 mode,
wherein the intra prediction mode information for the chroma component specifies the intra prediction mode of the chroma component,
wherein the intra prediction mode information for the chroma component of the image is based on a second codeword, the intra prediction mode of the chroma component is VER+8 mode, and the intra prediction mode of the luma component is one of a DC mode, a vertical mode or, a horizontal mode, and
wherein the first codeword is shorter than the second codeword.

8. The encoding apparatus according to claim 7, wherein the circuitry is further configured to set the intra prediction mode information for the chroma component to 4 based on the intra prediction mode of the chroma component is same as the intra prediction mode of the luma component.

9. The encoding apparatus according to claim 7, wherein the circuitry is further configured to determine the intra prediction mode of the chroma component based on the intra prediction mode information for the chroma component.

10. The encoding apparatus according to claim 7, wherein the intra prediction mode of the chroma component is one of the vertical mode, the horizontal mode, or the DC mode.

11. The encoding apparatus according to claim 10, wherein the circuitry is further configured to determine the intra prediction mode of the chroma component based on the intra prediction mode information for the chroma component and the intra prediction mode of the luma component is one of the vertical mode, the horizontal mode, or the DC mode.

12. An encoding method, comprising:
encoding image data based on intra prediction mode information for a chroma component of an image,
wherein the intra prediction mode information for the chroma component of the image is based on a first codeword, and each of an intra prediction mode of the chroma component and an intra prediction mode of a luma component of the image is VER+8 mode,
wherein the intra prediction mode information for the chroma component specifies the intra prediction mode of the chroma component,
wherein the intra prediction mode information for the chroma component of the image is based on a second codeword, the intra prediction mode of the chroma component is VER+8 mode, and the intra prediction mode of the luma component is one of a DC mode, a vertical mode or, a horizontal mode, and
wherein the first codeword is shorter than the second codeword.

\* \* \* \* \*